(No Model.)
E. V. THOMAS.
ADJUSTABLE VALVE PLATE.
No. 426,151.            Patented Apr. 22, 1890.
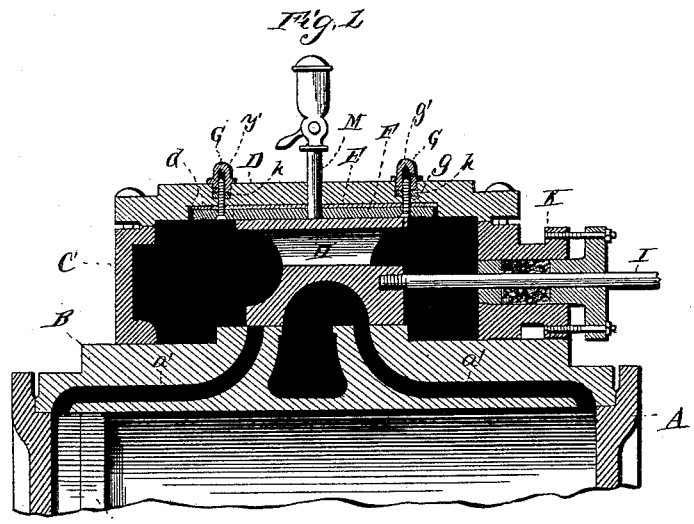
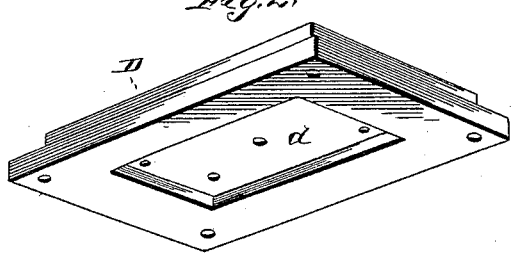
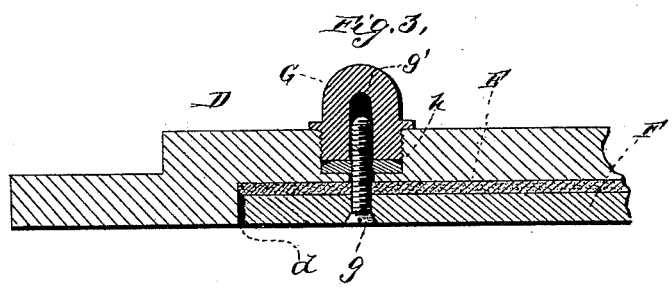
Witnesses:
Chas. L. Taylor
R. A. Balderson
Inventor:
E. V. Thomas,
By his Attorneys,
Higdon & Higdon
THE NORRIS PETERS CO., PHOTO-LITHO., WASHINGTON, D. C.

UNITED STATES PATENT OFFICE.

EDMESTON V. THOMAS, OF KANSAS CITY, MISSOURI.

ADJUSTABLE VALVE-PLATE.

SPECIFICATION forming part of Letters Patent No. 426,151, dated April 22, 1890.

Application filed December 10, 1889. Serial No. 333,233. (No model.)

*To all whom it may concern:*

Be it known that I, EDMESTON V. THOMAS, of Kansas City, Jackson county, Missouri, have invented certain new and useful Improvements in Adjustable Valve-Plates, of which the following is a full, clear, and exact description, reference being had to the accompanying drawings, forming a part hereof.

My invention relates to improvements in adjustable valve-plates for steam-chests; and it consists in the novel construction and arrangement hereinafter set forth and described.

In the drawings, which illustrate the manner of carrying out my invention, Figure 1 is a central longitudinal section through the steam-chest, showing part of the steam-cylinder broken away. Fig. 2 is a perspective view of the steam-chest covering D; and Fig. 3 is a sectional detail view of said covering D, showing the manner in which the adjustable plate $d$ is secured in position.

Referring to the drawings by letter, A represents a steam-chest constructed in the ordinary manner and covered by suitable plate B, said covering or plate B being provided with suitable steam-channels $a'$ for the passage of steam.

C is a steam-chest having a suitable plate D secured thereon in a suitable manner, said plate D having a recess sunk in the under side a sufficient depth to receive the plate F and compressible packing E, said plate F being secured and held in position by a suitable bolt or screw $g$. Said bolt $g$, passing upward through the plate and packing F and E, is secured in the chest-covering D by a suitable nut $h$.

G is a large acorn-shaped jam-nut provided with a cavity $g'$, which fits over bolt $g$. Said jam-nut G is provided with threads, which secure it rigidly in chest-covering D, thus causing it to bear securely against nut $h$, holding the same in position. Being screwed down in this manner, nut $h$ cannot work loose in any way, and the plate F is thereby held rigid.

$d$ is the recess in said chest-covering D, in which said plate F is secured. The packing E is to keep the steam from passing between the adjustable plate F and steam-chest covering D.

H is a valve provided with a piston-rod I, which is properly secured in said valve H. This piston-rod I operates through the steam-chest fittings K, which are constructed in a proper manner.

M is the lubricating-tube, on which is secured the oil-cup for lubricating the valve H.

Having this adjustable plate constructed in the manner described, it may be adjusted to the valve when necessary, the packing E being sufficient to cut off the passage of steam around said plate.

Having thus fully described my invention, what I claim as being new, and desire to secure by Letters Patent, is—

1. The combination, with the steam-chest cover recessed in its inner face, of the adjustable valve-plate secured thereon, the packing interposed between said plate and cover, the bolts and nuts for securing the said plate in the recess, and the jam-nuts for locking the nuts in place, all arranged and adapted to operate substantially as shown and described.

2. The combination, with the steam-chest cover D, recessed as at $d$, of the valve-plate F, the compressible packing E, the bolts $g$, nuts $h$, and jam-nuts $g'$, all arranged and adapted to operate substantially as shown and described.

In testimony whereof I affix my signature in presence of two witnesses.

EDMESTON V. THOMAS.

Witnesses:
CHAS. L. TAYLOR,
R. A. BALDERSON.